US008714887B2

(12) United States Patent
Tipps et al.

(10) Patent No.: US 8,714,887 B2
(45) Date of Patent: May 6, 2014

(54) FASCIA COUNTER-BORE BIT AND FASCIA SCREW

(75) Inventors: Michael J. Tipps, Woodstock, IL (US); Gus D. Tipps, Walworth, WI (US)

(73) Assignee: Abbott-Interfast Corporation, Wheeling, IL (US)

( * ) Notice: Subject to any disclaimer, the term of this patent is extended or adjusted under 35 U.S.C. 154(b) by 401 days.

(21) Appl. No.: 13/077,448

(22) Filed: Mar. 31, 2011

(65) Prior Publication Data

US 2012/0251257 A1   Oct. 4, 2012

(51) Int. Cl.
*B23B 35/00* (2006.01)

(52) U.S. Cl.
USPC .......... 408/1 R; 408/224; 42/483.1; 42/573.1

(58) Field of Classification Search
USPC .......... 408/1 R, 202, 223, 224, 225; 411/399; 52/483.1, 573.1, 474, 489.1, 489.2
See application file for complete search history.

(56) References Cited

U.S. PATENT DOCUMENTS

| | | | |
|---|---|---|---|
| 4,815,902 A | 3/1989 | Durfee, Jr. | |
| 6,558,097 B2 * | 5/2003 | Mallet et al. | 411/399 |
| 6,645,082 B1 | 11/2003 | Lessard et al. | |
| 7,147,409 B2 * | 12/2006 | Wienhold | 408/1 R |
| 7,258,513 B2 * | 8/2007 | Gertner | 408/67 |
| 7,264,427 B1 * | 9/2007 | Kunz-Mujica | 408/202 |
| 2009/0129881 A1* | 5/2009 | Kawade | 408/118 |
| 2010/0172706 A1* | 7/2010 | Wirth et al. | 408/224 |

FOREIGN PATENT DOCUMENTS

| | | | | |
|---|---|---|---|---|
| DE | 2601519 A | * | 7/1976 | B23B 51/08 |
| DE | 3610016 A1 | * | 10/1987 | B23B 51/08 |
| DE | 10 2009 010 123 A1 | | 8/2010 | |
| GB | 1378869 A | * | 12/1974 | B23B 51/10 |
| JP | 11058115 A | * | 3/1999 | B23B 51/00 |
| JP | 2001018107 A | * | 1/2001 | B23B 51/08 |
| JP | 2009166225 A | * | 7/2009 | B23B 51/08 |

OTHER PUBLICATIONS

EP Search Report issued in EP 12 16 0243, dated Jul. 18, 2012.
Chinese office action issued in Chinese App. No. 201210097375.5, issued Dec. 19, 2013.

* cited by examiner

*Primary Examiner* — Daniel Howell
*Assistant Examiner* — Michael Vitale
(74) *Attorney, Agent, or Firm* — Greer Burns & Crain Ltd.

(57) ABSTRACT

A drill bit has a drill portion having a first diameter, a cutting point at one end, and a counter-bore portion at the other end. The counter-bore portion has a second diameter larger than the first diameter. A stop portion located adjacent the counter-bore portion on a side opposite to the drill portion has a third diameter larger than the second diameter.

A screw for use with the drill bit has an unthreaded portion, a threaded portion on one end and a head on the other end. The first diameter of the drill bit is about 1.5 to 2.5 times as large as the diameter of the unthreaded portion of the screw, and less than the diameter of the head of the screw. The diameter of the head is substantially the second diameter of the drill bit, and the head has a depth substantially equal to the depth of a recess made by the counter bore portion of the drill bit.

12 Claims, 3 Drawing Sheets

FASCIA COUNTER-BORE BIT AND FASCIA SCREW

This invention relates to counter-bore bits and screws especially useful for installing fascia boards made of composite materials, and more particularly, to counter-bore bits and screws that allow expansion and contraction of composite fascia boards due to moisture.

BACKGROUND OF THE INVENTION

The use of composite materials for decking is increasing. Composite boards are normally applied over a natural wood sub-frame of joists, and composite material fascia boards are often used as a decorative cover applied to the outer, vertical plane of the sub-frame joist structure, around the perimeter of the deck. Fascia boards have yielded long lasting and aesthetically appealing results, but have also created new installation considerations.

Composite decking and fascia materials experience a change in overall size when heated, referred to as thermal expansion. Natural wood framing members lose moisture content when heated and, as a consequence, shrink. This board expansion, combined with sub-frame shrinkage, results in directly opposing forces that cause problems all too frequently manifested as physical distortion of the composite fascia boards and/or broken screws. These problems are most commonly associated, throughout the industry, with the installation of generally thinner composite fascia board materials.

The combined expansion/contraction affects the fascia/joist combination both laterally along their combined length, as well as vertically in their combined height. Movement through expansion/contraction of the materials has been measured to be as much as ⅜" loss in combined height. If screws are purchased in a heavy gauge so as to reduce breakage, the fascia material often distorts in an outward protrusion commonly referred to as "buckling" or oil-canning. This distortion takes place between the fixed screw locations, causing an undesirable appearance. If lighter gauge screws are used, the combined shear pressures of expansion and shrinkage between the materials can break the screw, losing installation integrity. The end-use customer in these instances often perceives the problem to be with the screws or with the fascia material and makes a manufacturer's warranty claim, when in reality, the biggest contributing factor is the natural wood components being used and a failure to allow for this natural movement during installation. Thus, there is a need to develop an installation method or system that allows for this expansion/contraction movement.

Accordingly, one object of the present invention is to provide new and improved drill bits and screws.

Another object of the invention is to provide new and improved drill bits and screws that allow for movement of fascia materials while reducing the shear pressure placed upon the screws, when fascia boards are fastened to wooden joists.

SUMMARY OF THE INVENTION

A drill bit has a drill portion having a first diameter, a cutting point at one end, and a counter-bore portion at the other end. The counter-bore portion has a second diameter larger than the first diameter. A stop portion located adjacent the counter-bore portion on a side opposite to the drill portion has a third diameter larger than the second diameter.

A screw for use with the drill bit has an unthreaded portion, a threaded portion on one end and a head on the other end. The first diameter of the drill bit is about 1.5 to 2.5 times as large as the diameter of the unthreaded portion of the screw, and less than the diameter of the head of the screw. The diameter of the head is substantially the second diameter of the drill bit, and the head has a depth substantially equal to the depth of an opening made by the counter bore portion of the drill bit.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 3:
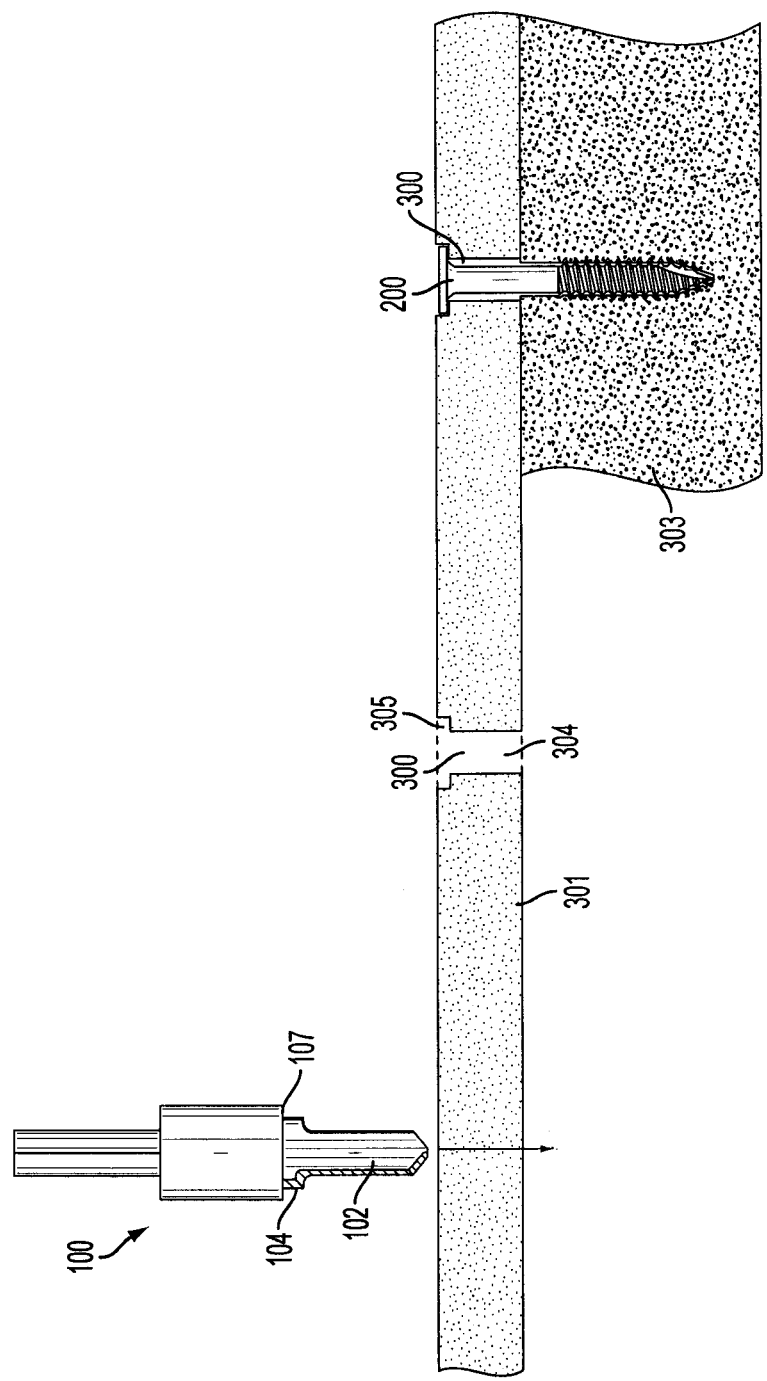
FIG. 3 is a diagram illustrating the drill bit of FIGS. 1A-1D and the screw of FIGS. 2A-2C in use.

In the embodiments described in the specification, a drill bit 100 is used to drill a hole 300 through a fascia board 301, as seen in FIG. 3. The hole 300 includes a central bore 304 and an oversized recess 305. A fastener 200 is then inserted through the opening 300 and is secured in a joist 303. The drill bit 100 and fastener 200 will now be described in more detail.

As seen in FIGS. 1A-1D, a drill bit 100 has an initial hole-drilling section 102 having a diameter D1, a tip 103, a counter-bore head-sinking section 104 having a diameter D2, a depth stop 106 having a stop surface 107 and a diameter D3, and a hexagonal shaft 108. The hole-drilling section 102 is at least long enough to bore completely through the fascia board stock 301 (FIG. 3).

The hole-drilling section 102 creates the central bore 304, and the counter-bore head-sinking section 104 creates the oversized recess 305. The stop surface 107 sets the depth of the recess 305.

The resulting hole 300 made by the drill bit is preferably 1.5 to 2.5 times the diameter of the screw to be used, and can be straight or tapered. The resulting oversized hole created by the drill bit 100 allows movement of the fascia material 301 around the screw 200.

The counter-bore head-sinking section 104 of the drill bit 100 is designed to bore a predetermined depth recess, slightly larger than the head of the fastener 200, and at a depth allowing the fastener head to be set just below the surface of the fascia board 301. This allows the fastener 200 to hang the fascia board 301 without embedding the screw into the fascia board. Further movement of the fascia board is allowed by flexure or "rocking" of the screw head in the oversized recess 305. The stop surface 107 of the bit assures an appropriate counter-bore head recess depth every time the bit is used. The hexagonal shaft 108 allows the bit to be installed into a common drill-chuck or drive guide extension.

In one embodiment, the total length of the drill bit 100 was 2.1 inches. The length of the hexagonal shaft 108 was 0.750 inches, and the length of the depth stop 106 was 0.625 inches. The length of the initial hole drilling section 102 was 0.725 inches, measured from the stop surface 107 to the tip 103. The diameter D1 was 0.250 inches, the diameter D2 was 0.410 inches, and the diameter D3 was 0.500 inches. The counter-bore head sinking section 104 had a cutting depth of 0.100 inches. The transition from the counter-bore head sinking section 104 to the initial hole drilling section 102 had a curvature with a radius of about 0.050 inches.

Figure 1A:
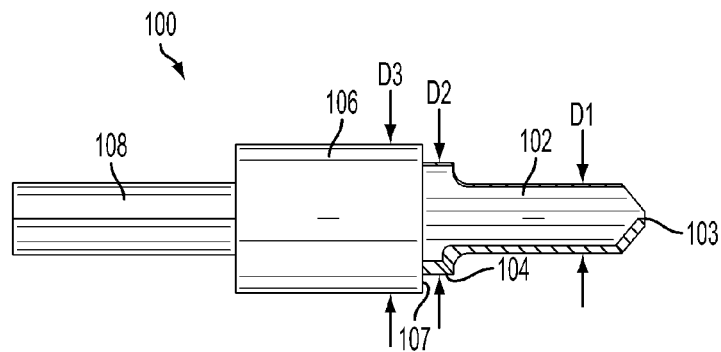
FIG. 1A is a side view of a counter bore drill bit according to one embodiment of the present invention.
Figure 1B:
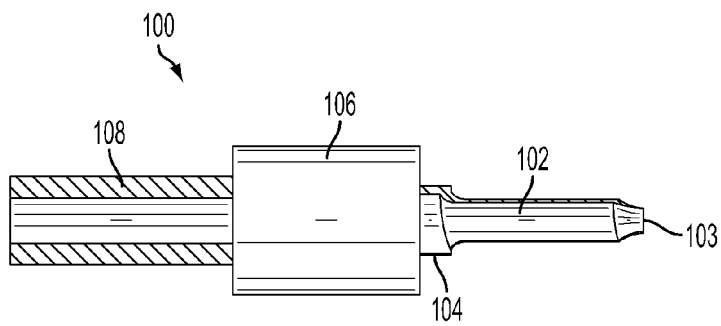
FIG. 1B is a top view of the counter bore drill bit of FIG. 1A.
Figure 1C:
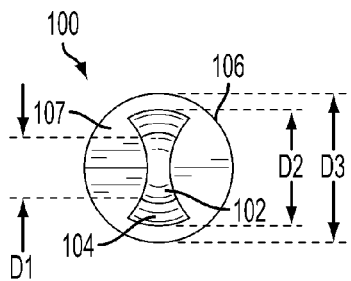
FIG. 1C is an end view of the counter bore drill bit of FIG. 1A.
Figure 1D:
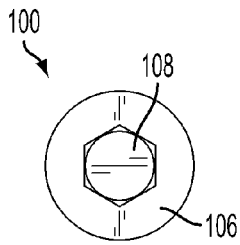
FIG. 1D is an end view of the other end of the counter bore drill bit of FIG. 1A.
Figure 2A:
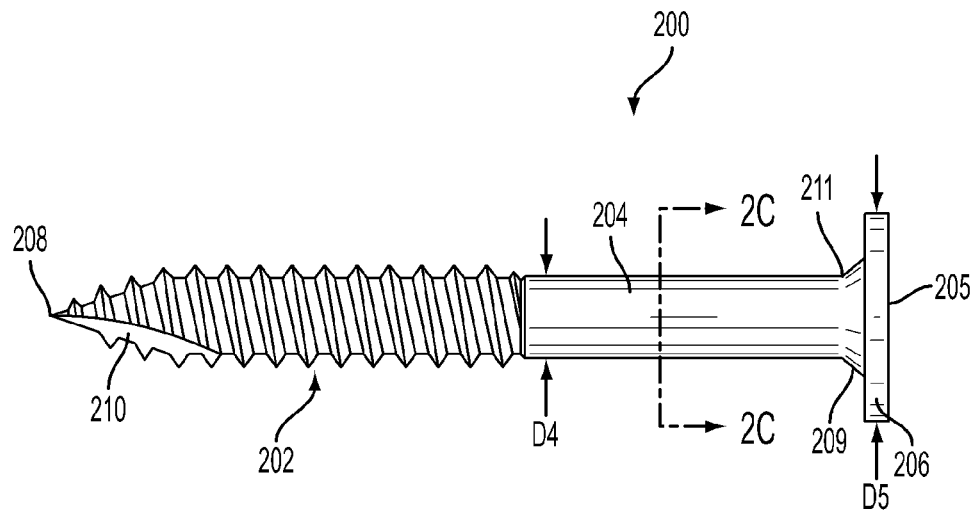
FIG. 2A is a side view of a screw used in one embodiment of the present invention.
Figure 2B:
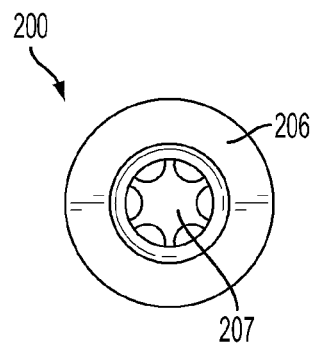
FIG. 2B is an end view of the screw of FIG. 2A.
Figure 2C:
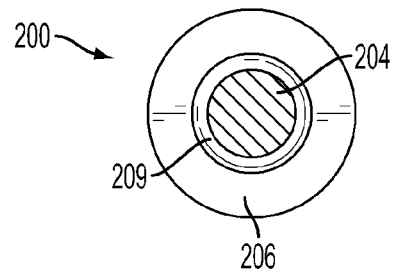
FIG. 2C is a cross-sectional view of the screw of FIG. 2A, taken along lines 2C-2C.

Referring now to FIGS. 2A-2C, the screw 200 includes a threaded shaft 202, an unthreaded shaft portion 204 having a diameter D4, and a head 206 having a diameter D5. The threaded shaft 202 has a tip 208 and a cutting portion 210. The unthreaded shaft portion 204 has a beveled section 209 where it joins the head 206. The fastener 200 also has a drive recess 207.

The screw 200 is preferably made of carbon-steel or stainless steel material. The use of stainless steel material will likely be preferred as the pliable nature of un-hardened stainless steel materials might allow excessive movement through bending of the screw and failure of the screw.

The drive recess 207 can be selected from one of several available drive types, providing engagement with a corresponding drive bit and providing the rotational drive force needed to install the screw. The head 206 of the screw 200 is sufficiently large so as to exceed the diameter of the central bore 304 created by the fascia counter-bore bit 100, and is thick enough to assure enough pressure to hold the fascia board 301 in place. The head thickness is preferably slightly less that the recess 305 around the central bore 304 created by the fascia bit 100. The bit 100 and screw 200 are matched in head-size characteristics, so that the screw head 206 substantially fills the width and thickness of the recess hole 305 provided by the bit.

The unthreaded shaft portion 204 of the screw 200 is preferably larger in diameter than the threaded portion 202, tapering down to the threaded portion diameter to allow for the displacement of materials in the head-recess-forming process when producing the screw.

The length of the threaded portion 202 can be at least half of the total length of the screw 200. The threaded portion 202 is preferably designed with a low-pitched, torque-reducing thread, to decrease instances of screw breakage due to the torsional load commonly placed upon the screw when driving.

The shank-slot, cutting portion 210 is applied to the tip 208 of the screw 200 to facilitate the starting and entry of the screw into the natural wood sub-frame 303 at the rim joists. The starting tip and thread formed portion of the screw might also be altered to perform the same function when installed into a steel or metal alloy sub-frame at the rim joists.

In one embodiment, the screw 200 had a total length of about 1.75 inches. The threaded portion 202 was a No. 8-18 wood thread that was about 1.25 inches in length. The unthreaded shaft portion 204 was about 0.5 inches from an outer end 205 of the head 206 to the beginning of the threaded portion 202. The diameter D4 was about 0.145 inches. The head 206 had a thickness of about 0.075 inches, and the total distance from the outer end 205 of the head 206 to a narrow portion 211 of the unthreaded portion 204 was about 0.150 inches. The beveled section 209 was at an angle of 40° from the central axis of the screw. The diameter D5 was about 0.400 inches.

While the principles of the invention have been described above in connection with specific apparatus and applications, it is to be understood that this description is made only by way of example and not as a limitation on the scope of the invention.

What is claimed is:

1. A method for hanging a fascia board on a joist comprising:
   drilling an opening in the fascia board, the opening having a central bore and an oversized recessed portion,
   inserting a single piece fastener through the opening and securing the single piece fastener in the joist, the single piece fastener having a head about the size and depth of the oversized recessed portion, and an unthreaded shaft portion, the central bore having a first diameter about 1.5 to 2.5 times a fourth diameter of the unthreaded shaft portion of the single piece fastener,
   whereby the single piece fastener flexes when the fascia board or joist move due to thermal contraction or expansion.

2. The method of claim 1, wherein the fascia board is made of composite material.

3. The method of claim 1, wherein the joist is made of wood.

4. The method of claim 1, wherein the joist is made of metal.

5. The method of claim 1, wherein the single piece fastener is made of stainless steel.

6. The method of claim 1, wherein the single piece fastener is made of carbon steel.

7. A drill bit and single piece screw combination,
   the drill bit comprising:
   a drill portion having a first diameter and a cutting point at one end,
   a counter-bore portion at the other end of the drill portion, the counter-bore portion having a second diameter larger than the first diameter,
   a stop portion located adjacent the counter-bore portion on a side opposite to the drill portion,
   the stop portion having a third diameter larger than the second diameter, and
   a shank for engagement by a drill;
   the single piece screw comprising:
   an unthreaded portion, a threaded portion on one end and a head on another end,
   the first diameter of the drill bit being about twice as large as a fourth diameter of the unthreaded portion of the single piece screw, and less than a fifth diameter of the head of the single piece screw,
   the fifth diameter of the head being substantially the second diameter of the drill bit, and
   the head having a depth substantially equal to the depth of an opening made by the counter bore portion of the drill bit,
   whereby the single piece screw can flex when installed in a joist through an opening in the fascia board created by the drill portion of the drill bit, the single piece screw flexing when the fascia board or joist move due to thermal contraction or expansion.

8. The combination of claim 7, wherein the fascia board is made of composite material.

9. The combination of claim 7, wherein the joist is made of wood.

10. The combination of claim 7, wherein the joist is made of metal.

11. The combination of claim 7, wherein the single piece screw is made of stainless steel.

12. The combination of claim 7, wherein the single piece screw is made of carbon steel.

* * * * *